UNITED STATES PATENT OFFICE.

ARTHUR HAUSDÖRFER AND FRIEDRICH REINGRUBER, OF ELBERFELD, GERMANY, ASSIGNORS TO THE FARBENFABRIKEN OF ELBERFELD COMPANY, OF NEW YORK.

BLUE DIPHENYLNAPHTHYLMETHANE DYE.

SPECIFICATION forming part of Letters Patent No. 647,260, dated April 10, 1900.

Application filed January 16, 1900. Serial No. 1,653. (No specimens.)

*To all whom it may concern:*

Be it known that we, ARTHUR HAUSDÖRFER and FRIEDRICH REINGRUBER, doctors of philosophy, chemists, (assignors to the FARBENFABRIKEN OF ELBERFELD COMPANY, OF NEW YORK,) residing at Elberfeld, Germany, have invented a new and useful Improvement in Blue Diphenylnaphthylmethane Dye; and we hereby declare the following to be a clear and exact description of our invention.

We have found that valuable new dyestuffs capable of dyeing wool in acid-baths blue shades are obtained if basic dyestuffs of the so-called "Victoria-blue" series having the general formula

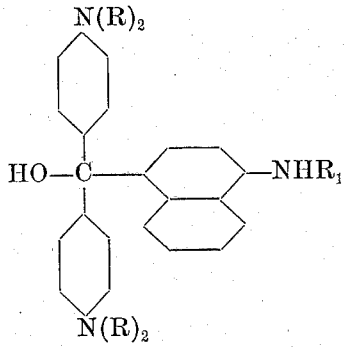

(R meaning an alkyl radical such as methyl, ethyl, or the like, $R_1$ meaning an alkyl radical such as methyl, ethyl, phenyl, paratolyl, or the like)—are treated in a suitable manner with sulfonating agents.

The new dyestuff sulfonic acids represent, when dry and pulverized, brown powders soluble in water with a blue color and dyeing unmordanted wool in acid-baths very clear and even blue shades.

In carrying out our new process practically we can proceed as follows, the parts being, by weight: twenty parts of the carefully dried and pulverized dyestuff obtainable by condensing tetramethyldiamidobenzophenone with paratolylalphanaphthylamin in the presence of phosphorus oxychlorid are dissolved in one hundred parts of sulfuric monohydrate while being cooled and stirred. To the solution thus produced thirty-six parts of fuming sulfuric acid (containing seventy per cent. of $SO_3$) are added while continuously stirring, the temperature being kept below zero. The mixture thus obtained is allowed to stand for some time at from 0° to 5° centigrade until a test portion poured into water dissolves completely in hot dilute alkalies. The mixture is then immediately poured on ice and is neutralized with sodium carbonate, by means of which operation the dyestuff is precipitated. Finally the dyestuff is isolated by filtration. It can be further purified in the known manner by dissolving the same in hot water and precipitating again from the resulting solution by the addition of common salt.

The new coloring-matter thus produced represents when dry and pulverized a brown powder soluble in water with a blue color. It is soluble in alcohol with a blue color; in glacial acetic acid with a greenish-blue color. In concentrated sulfuric acid (of 66° Baumé) it dissolves with a dark-red color, which changes into brown on the addition of a small quantity of ice, while the color is changed first into grayish green and then into grayish blue on the addition of a larger quantity of ice, a dark-brown precipitate being at the same time separated. The new dyestuff yields on wool in acid-baths beautiful blue, clear, and even shades. Very similar results are obtained if other of the above-defined basic dyestuffs are employed in the foregoing example.

Having now described our invention and in what manner the same is to be performed, what we claim as new, and desire to secure by Letters Patent, is—

1. The process for producing new diphenylnaphthylmethane dyestuffs which process consists in first acting with fuming sulfuric acid on basic dyestuffs of the general formula:

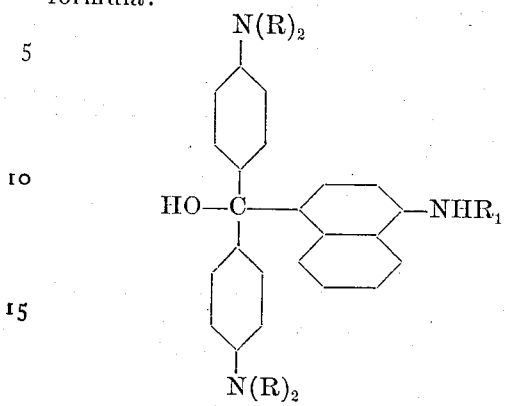

(R meaning an alkyl radical such as methyl, ethyl, $R_1$ meaning an alkyl radical such as methyl, ethyl, phenyl, tolyl,) and secondly isolating the dyestuff sulfonic acids thus produced in the form of their alkaline salts, substantially as hereinbefore described.

2. The process for producing a new diphenylnaphthylmethane dyestuff which process consists in first acting with fuming sulfuric acid on the basic dyestuff of the formula:

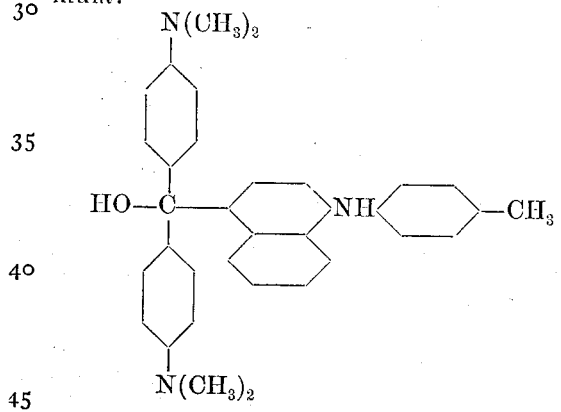

and secondly isolating the dyestuff sulfonic acid thus obtained in the form of an alkaline salt, substantially as hereinbefore described.

3. As new articles of manufacture the new dyestuffs of the diphenylnaphthylmethane series being when dry and pulverized brown powders, soluble in water and in alcohol with a blue color, dyeing wool in acid-baths blue shades, substantially as hereinbefore described.

4. As a new article of manufacture the new dyestuff of the diphenylnaphthylmethane series obtained from the basic coloring-matter of the formula:

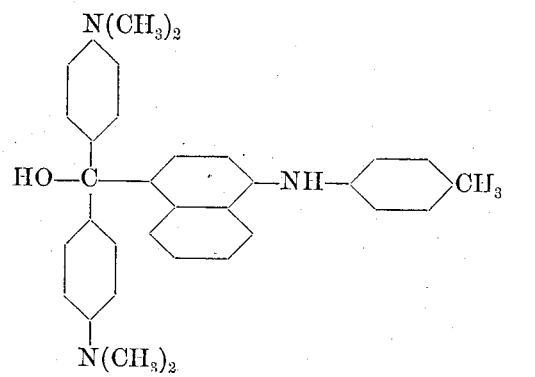

being when dry and pulverized a brown powder, soluble in water and in alcohol with a blue color, in glacial acetic acid with a greenish-blue color, being dissolved by concentrated sulfuric acid with a dark-red color which changes into brown on the addition of a small quantity of ice while the color is changed first into grayish green and then into grayish blue on the addition of a larger quantity of ice a dark-brown precipitate being at the same time precipitated, dyeing wool in acid-baths beautiful blue, clear and even shades, substantially as hereinbefore described.

In testimony whereof we have signed our names in the presence of two subscribing witnesses.

ARTHUR HAUSDÖRFER.
FRIEDRICH REINGRUBER.

Witnesses:
OTTO KÖNIG,
F. I. RITTERHAUS.